United States Patent Office 3,449,661
Patented June 10, 1969

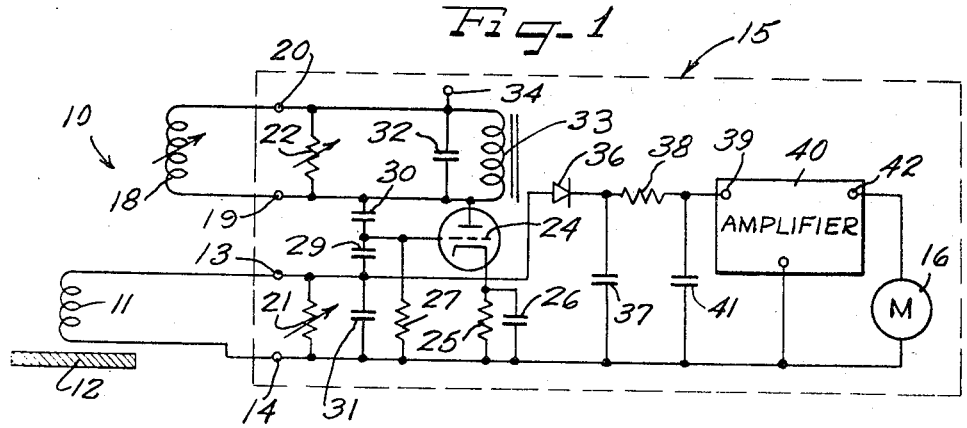
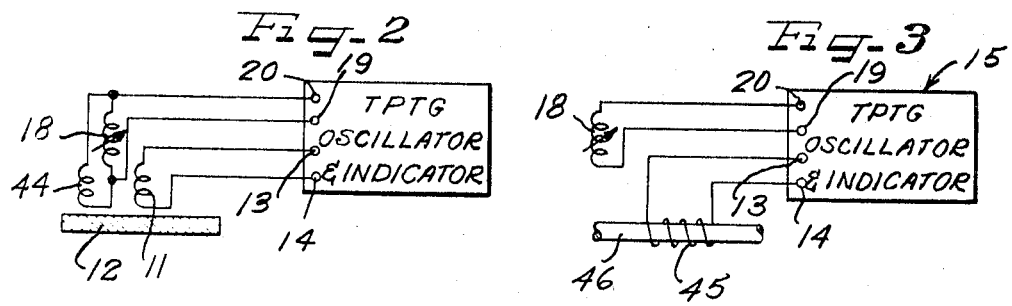
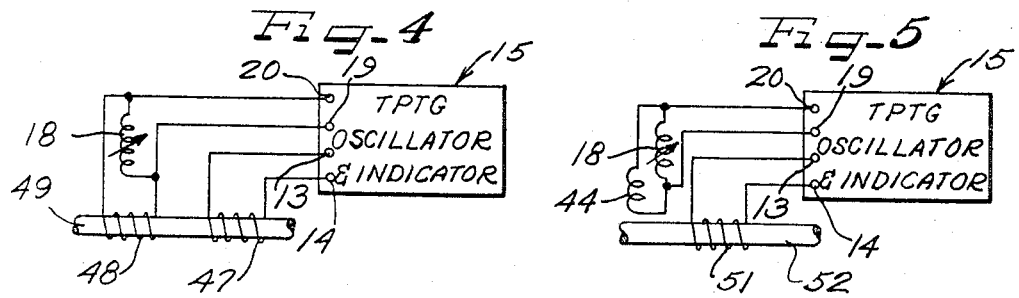
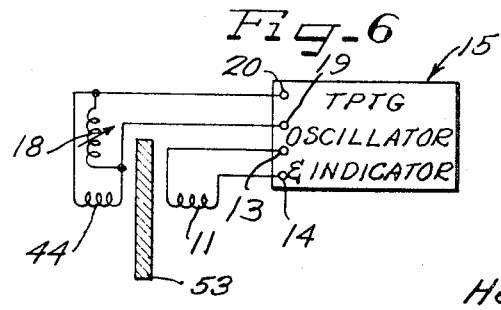

3,449,661
EDDY CURRENT TESTING SYSTEM HAVING LIFT-OFF COMPENSATION, AND UTILIZING A TUNED PLATE-TUNED GRID OSCILLATOR
Heino Puidak, Chicago, Ill., assignor to Magnaflux Corporation, Chicago, Ill., a corporation of Illinois
Filed Dec. 11, 1963, Ser. No. 329,716
Int. Cl. G01r 33/00, 33/14
U.S. Cl. 324—34                 5 Claims

ABSTRACT OF THE DISCLOSURE

Conductivity measuring system wherein first and second parallel resonant circuits are respectively coupled between input and output electrodes and a common electrode of an amplifier device with a test coil being coupled into one of the resonant circuits. The relative reactances and resistances of the resonant circuits are adjusted to obtain substantially no change in the indication in response to changes in the effective spacing between the coil and the workpiece.

---

This invention relates to an eddy current testing system and more particularly to an eddy current testing system which is comparatively simple in construction and operation while being highly accurate and very stable and reliable in performance.

Various eddy current testing systems have heretofore been proposed wherein an AC-excited test coil is arranged to be placed in proximity to a workpiece with means for measuring the impedance of the coil to determine the conductivity of the workpiece, the spacing between the coil and the workpiece or some other variable. Systems of this type have in some cases included means for compensating for or minimizing the effect of certain variables. For example, conductivity measuring systems have been proposed incorporating a "lift-off" compensation, wherein the effect of changes in spacing between the test coil and the workpiece have been minimized. However, such prior art systems have been comparatively complex and/or have not been completely stable and reliable in operation, frequent adjustment being usually necessary, particularly in those having lift-off or other compensation means.

According to this invention, a very simple circuit is used wherein a test coil is used as part of one of two parallel resonant circuits of a tuned plate-tuned grid oscillator, one of the resonant circuits being coupled between the grid and cathode of a vacuum tube and the other being coupled between the plate and cathode of a tube. With such resonant circuits being tuned to approximately the same frequency, oscillations are produced at a slightly lower frequency at which both circuits present an inductive reactance. Such tuned plate-tuned grid oscillators are of course well known in the art, it being noted that it is possible to couple one resonant circuit to the screen or another grid of a multi-grid tube rather than to the plate, and it is also possible to use transistors or any other amplifier device having input, output and common electrodes equivalent to the grid, plate and cathode of a vacuum tube.

Means are provided for measuring the amplitudes of the oscillations produced by the tuned plate-tuned grid oscillator and it is found to be possible to obtain a highly accurate indication of variables to be measured, such as variations in effective spacing between the coil and the workpiece or variations in the conductivity of the workpiece. It is found also that the oscillator circuit is very stable and comparatively insensitive to variations in tube characteristics, temperature, supply voltage and other such variables.

Important features of the invention reside in the provision of simple but very effective means for compensating for changes in certain variables. In one preferred arrangement, which is used for the measurement of conductivity, it is found that lift-off compensation can be readily obtained by simple adjustment of the relative reactances and relative resistances of the resonant circuits.

According to a further feature of the invention, a second coil is used as part of the second resonant circuit and is placed in proximity to a workpiece portion which serves as a reference, the reference workpiece portion being either a portion of the same workpiece which is tested by the first coil or being a completely separate member serving as a standard. This arrangement is particularly advantageous in systems for detecting defects such as cracks in the workpiece.

Another important feature of the invention is in a comparatively simple arrangement in which a detector circircuit has an input connected to the grid resonant circuit to obtain a highly accurate and stable indication with a minimum number of components.

Further features of the invention reside in test coil and circuit arrangements for increasing accuracy and stability and for compensating for the effect of certain variables. These and other objects, features and advantages will become more fully apparent from the following detailed description taken in conjunction with the accompanying drawings which illustrate preferred embodiments and in which:

FIGURE 1 is schematic diagram illustrating a tuned plate-tuned grid oscillator and indicator circuit constructed according to the invention and a preferred coil arrangement designed for the measurement of conductivity or permeability or for detection of cracks or defects which effectively produce conductivity and/or permeability changes;

FIGURE 2 illustrates another preferred arrangement using two coils in proximity to a workpiece;

FIGURE 3 illustrates a further preferred arrangement similar to that of FIGURE 1, but with the test coil in surrounding relation to an elongated workpiece;

FIGURE 4 illustrates another preferred arrangement similar to FIGURE 2 but with both coils in surrounding relation to an elongated workpiece;

FIGURE 5 illustrates still another preferred arrangement using two coils at right angles to each other; and FIGURE 6 illustrates yet another preferred arrangement with two coils on opposite sides of a workpiece.

Reference numeral 10 generally designates an eddy current testing system constructed according to the principles of this invention. The system 10 comprises a test coil 11 which is disposed in proximity to a workpiece 12 and is connected to terminals 13 and 14 of a tuned plate-tuned grid oscillator and indicator circuit 15 which includes a meter 16. The system 10 of FIGURE 1 is specifically designed for the measurement of the conductivity of the workpiece 12 and an important feature of the invention is that the system can be readily adjusted to provide lift-off compensation, minimizing the effect of variations in the spacing between the coil 11 and the workpiece 12. In brief, the lift-off compensation is obtained by adjustment of a variable inductor 18 connected between terminals 19 and 20 of the circuit 15, and adjustment of either one or both of a pair of variable resistors 21 and 22, resistor 21 being connected between terminals 13 and 14 and resistor 22 being connected between terminals 19 and 20. Resistors 21 and 22 may be located externally of the oscillator and indicator circuit 15 if desired and in most cases, only one of the variable resistors is required to obtain the proper adjustment.

The illustrated circuit 15 uses a triode vacuum tube 24 having a cathode connected to ground through a bias resistor 25 and a by-pass capacitor 26, a grid connected to ground through a resistor 27 and to terminals 13 and 19 through capacitors 29 and 30 and an anode or plate connected directly to the terminal 19.

A capacitor 31 is connected in parallel with the test coil 11 to define therewith a grid tank circuit and another capacitor 32 is connected in parallel with the variable inductor 18 and also in parallel with a fixed inductor 33 to define a plate tank circuit, one end of which is connected to the plate of the triode 24 and the other end of which is connected to a B+ terminal 34 which may be connected to the positive terminal of a suitable DC source having its negative terminal connected to ground.

Such grid and plate tank circuits are tuned to resonants at approximately the same frequency and the circuit is caused to oscillate at a somewhat higher frequency at which both offer an inductive reactance, a positive or regenerative feed back voltage being then fed back from the plate circuit to the grid-cathode circuit of the tube 24.

An important feature of the circuit is in the provision of a detector circuit having an input connected to the grid tank circuit. In particular, the terminal 13, which forms one terminal of the grid tank circuit, is connected directly to the anode of a diode 36 having its cathode connected through a first filter capacitor 37 to ground and through a resistor 38 to an input terminal 39 of an amplifier 40, input terminal 39 being connected through a second filter capacitor 41 to ground. The amplifier 40 has an output terminal 42 connected to one terminal of the meter 16, the other terminal of the meter 16 being connected to ground. This detector arrangement has a minimum number of component parts, and it is found that it is highly sensitive in operation while being highly stable.

As above noted, lift-off compensation is obtained by adjustment of the inductor 18 and one or both of the resistors 21 and 22. Ordinarily, only one of the resistors need be adjusted and the other resistor may be fixed, or it may be eliminated entirely. By way of example, it may be assumed that the resistor 21 is fixed at its maximum value, or eliminated entirely. The resistor 22 is then adjusted to its maximum value and the inductor 18 is adjusted to an intermediate value. Resistor 22 is then adjusted while moving the coil 11 between a position pressed against the workpiece 12 and a position remote therefrom, the effect on the meter 16 being noted as resistor 22 is so adjusted, a position will be found at which the change in the reading of the meter 16 is minimized.

After so adjusting the resistor 22, the inductor 18 may be adjusted in one direction or the other while again moving the coil 11 between a position pressed against the workpiece 12 and a position remote therefrom, and while again observing the indication of the meter 16. A position of adjustment of the inductor 18 will be found at which the effect on the meter 16 is further minimized. Resistor 22 may then be readjusted in the same manner, after which inductor 18 may be readjusted. Ultimately, with this procedure, positions of adjustment will be found at which excellent lift-off compensation is obtained, and it will be found also that this adjustment will be very stable and reliable.

With respect to the manner in which the circuit functions to provide such lift-off compensation, it is noted that the coil 11 presents a certain effective inductive reactance and a certain effective resistance when in contact with the workpiece 12 and that such are changed when the coil is moved away from the workpiece. The amplitude of oscillation is affected by the ratio of the grid excitation voltage to the AC plate-cathode voltage, which ratio is determined by the relative inductive impedances presented by the grid and plate tank circuits. Such relative impedances, in turn, are determined by the relative amounts of detuning of the plate and grid tank circuits, and by the relative resistances thereof. With these considerations in mind, it can be observed that the changes in inductive reactance and resistance produced by movement of the test coil toward and away from the workpiece can be caused to have equal and opposite effects with respect to the amplitude of oscillation. As a practical matter, however, it is not possible to exactly calculate the values at which compensation is obtained and the adjustment procedure as outlined above is preferred. It is, however, desirable to follow certain design considerations to obtain optimum results.

In particular, the inductance of the plate tank circuit should preferably be approximately twice the inductance of the grid tank circuit. For example, the midpoint of the range of adjustment of the inductor 18 may be such that the combined effective inductive reactance of the variable inductor 18 and the fixed inductor 33 is equal to twice the nominal inductive reactance of the test coil 11. In this connection, it is noteworthy that the fixed inductor 33 is not necessarily required, but is desirable in order to minimize the range in which the variable inductor 18 operates, to thereby obtain a finer adjustment of inductance.

By way of illustrative example and not by way of limitation, the test coil 11 may have an inductance of about 1.75 millihenries, the variable inductor 18 may have an inductance of from 2-9 millihenries, the fixed inductor 33 may have an inductance of 8 millihenries, the capacitors 31 and 32 may each have a capacitance of 0.01 microfarad, the capacitor 29 may have a capacitance of 0.25 microfarad, the capacitor 30 may have a capacitance of 0.002 microfarad, the resistor 27 may have a resistance of 100,000 ohms, the resistor 25 may have a resistance of 470 ohms, the capacitor 26 may have a capacitance of 0.05 microfarad, the capacitors 37 and 41 may have capacitances of 0.01 microfarad and the resistor 38 may have a resistance of 22,000 ohms. The diode 36 may be a IN 463A and the triode 24 may be one triode section of a type 5751 tube.

FIGURE 2 shows a modified arrangement which is substantially the same as that of FIGURE 1, except that a second test coil 44 is connected to the input terminals 19 and 20 of the oscillator and indicator circuit 15, in parallel with the variable inductor 18. In this arrangement, the fixed inductor 33, shown in FIGURE 1, may be removed or the values may be otherwise adjusted to obtain a balance between the values of the inductances in the grid and plate circuits. This arrangement may be adjusted by a method similar to that described above, to obtain lift-off compensation as to the coil 11 and to also obtain similar compensation with respect to movement of the second coil 44. The arrangement may then be used for the measurement of conductivity changes and particularly for the detection of cracks or other defects, the effect of which is the same as that produced by a change in conductivity. In the arrangement as illustrated, one portion of the workpiece 12 serves as a reference for testing of a second portion thereof. It will be understood, however, that the reference portion may be a completely separate member, if desired.

FIGURE 3 illustrates another modified arrangement which is the same as that of FIGURE 1, except that a coil 45 is substituted for the coil 11 and is disposed in surrounding relation to an elongated member 46 which may be a solid or hollow bar, tube or pipe. This arrangement may be compensated for variations in the transverse dimension or diameter of the workpiece 46 and/or variations in the positioning of the axis thereof relative to the axis of the test coil 45. Such compensation may be obtained by an adjustment procedure similar to that described above.

FIGURE 4 shows another modified arrangement which is similar to that of FIGURE 2, except that a coil 47 is substituted for the test coil 11 and another coil 48 is substituted for the coil 44, both coils 47 and 48 being disposed in surrounding relation to an elongated workpiece 49 which may be a solid or hollow rod, tube or pipe. Here again, completely separate members may be disposed within the two coils, rather than to have separate portions of the same workpiece 49 therewithin.

FIGURE 5 illustrates still another modified arrangement which is similar to that of FIGURE 2, except that a coil 51 is substituted for the coil 11, coil 51 being disposed in surrounding relation to an elongated workpiece 52 which may be either a solid or a hollow bar, tube or pipe. In this arrangement, the coil 44 is disposed adjacent a portion of the workpiece 52 (or adjacent a separate workpiece portion) and is disposed with axis at right angles to that of the coil 51, to minimize inductive coupling therebetween.

FIGURE 6 illustrates yet another modified arrangement which is similar to that of FIGURE 2, except that the coils 11 and 44 are disposed on opposite sides of a workpiece 53. In this case, the workpiece 53 effectively shields the coils 11 and 44 from one another, provided it is of a conductive material and of sufficient thickness. The arrangement of FIGURE 6 is capable of another mode of operation, however, to test workpieces of non-conductive dielectric materials or the like, or very thin sheets of conductive material, wherein the coils 11 and 44 are sufficiently close together to produce a mutual coupling affecting the amplitude of oscillations, such mutual coupling being affected by the thickness or other characteristics of of the workpiece 53.

It will be understood that modifications and variations may be effected without departing from the spirit and scope of the novel concepts of this invention.

I claim as my invention:

1. In a testing system including a test coil arranged to be placed in proximity to a workpiece to be magnetically coupled to a relatively small portion of the workpiece, the effective inductive reactance and effective resistance of said coil being thereby affected by variables including the effective spacing between the coil and said small portion of the workpiece and the effective conductivity of said small portion of said workpiece, an amplifier device having an input electrode, an output electrode and a common electrode, first and second power supply terminals, means connecting said first terminal to said common electrode, a first inductive reactance means and a first capacitive reactance means connected in parallel to form a first resonant circuit coupled between said input electrode and said first terminal, a second inductive reactance means and second capacitive reactance means connected in parallel to form a second resonant circuit coupled between said output electrode and said second terminal, said first inductive reactance means including said coil, means providing a capacitance between said input and output electrodes, said resonant circuits being tuned to approximately the same frequency to establish phase relationships such as to cause operation of said device as an oscillator at a lower frequency at which both of said resonant circuits offer an inductive reactance, and resistance means associated with one of said resonant circuits, said resistance means and at least one of said reactance means being adjustable to values such as to obtain substantially no change in the amplitude of oscillations in response to changes in said effective spacing while obtaining a large change in response to changes in said effective conductivity, the inductance of said second inductive reactance means being on the order of twice the inductance of said first inductive reactance means, and amplitude detector means coupled to said first resonant circuit.

2. In a testing system as defined in claim 1, said amplitude detector means comprising a capacitor having one terminal coupled to said first power supply terminal to be thereby coupled to one terminal of said first resonant circuit, and a diode coupled between the other terminal of said capacitor and the other terminal of said first resonant circuit to develop a DC voltage across said capacitor proportional to the AC voltage across said first resonant circuit.

3. In a testing system as defined in claim 1, said second inductive reactance means including a second coil arranged to be placed in proximity to a portion of the workpiece separate from said relatively small portion.

4. In a testing system as defined in claim 1, said coil being arranged to be placed in surrounding relation to said relatively small portion of the workpiece.

5. In a testing system as defined in claim 1, said second inductive reactance means including a second coil arranged to be placed in proximity to said relatively small portion of the workpiece with said test coil and said second coil being on opposite sides of the workpiece.

References Cited

UNITED STATES PATENTS

| | | | |
|---|---|---|---|
| 2,267,884 | 12/1941 | Zuschlag | 324—34 |
| 2,326,344 | 8/1943 | Elmendorf et al. | 324—40 |
| 2,663,867 | 12/1953 | Favara et al. | 324—34 |
| 2,939,073 | 5/1960 | Eul | 324—34 |

FOREIGN PATENTS

| | | |
|---|---|---|
| 122,073 | 12/1946 | Australia. |
| 574,808 | 1/1946 | Great Britain. |

RUDOLPH V. ROLINEC, *Primary Examiner.*

R. J. CORCORAN, *Assistant Examiner.*

U.S. Cl. X.R.

324—40